F. C. LIESCHKE.
CROP LIFTING ATTACHMENT FOR STRIPPER HARVESTERS.
APPLICATION FILED NOV. 25, 1918.

1,320,877.

Patented Nov. 4, 1919.

Inventor.
F. C. Lieschke.
Attorney.

UNITED STATES PATENT OFFICE.

FRIEDRICH C. LIESCHKE, OF ALMA PARK, NEAR WALLA WALLA, NEW SOUTH WALES, AUSTRALIA.

CROP-LIFTING ATTACHMENT FOR STRIPPER-HARVESTERS.

1,320,877.      Specification of Letters Patent.      Patented Nov. 4, 1919.

Application filed November 25, 1918. Serial No. 264,055.

*To all whom it may concern:*

Be it known that I, FRIEDRICH CHRISTIAN LIESCHKE, a subject of the King of Great Britain and Ireland, and a resident of the postal district of Alma Park, near the town of Walla Walla, in the county of Hume, State of New South Wales, Commonwealth of Australia, (whose post-office address is Alma Park, near the said town of Walla Walla,) have invented certain new and useful Improvements in Crop-Lifting Attachments for Stripper-Harvesters, of which the following is a specification.

This invention relates to machines commonly known as stripper harvesters and its object is to provide attachments for such machines whereby a crop or portion of a crop when it has fallen or been knocked down by rain, wind or other causes may be lifted upright so that it will be positively seized by the comb of the machine which removes the grain from the stalks as the implement moves forwardly.

The invention is adaptable to various different types of harvesters and includes a number of crop lifting members which project in front of the comb and are preferably curved and inclined downwardly toward their front ends so that the point of said members will pass beneath the fallen stalks and raise them into an upright position to be engaged by the teeth of the comb. The crop lifting members are so mounted that although the comb may be raised or lowered as desired the forward ends or points of the lifting members will always be disposed at a suitable height from the surface of the ground to pick up the fallen crop. The points of the crop lifting members may be hinged and provided with spring means whereby they will swing backwardly to pass an obstruction and after passing such obstruction will be returned to their normal position by said spring. The vertical position of the crop lifting members may furthermore be controlled and adjusted as desired by means of a hand lever interconnected with the crop lifting members as hereinafter described. This hand lever is provided with a pawl engaging a quadrant which is provided with ratchet teeth inclined in one direction so that any excessive upward pressure on the forward end of the crop lifting members will cause said hand lever to automatically fly back over the quadrant in the direction in which the teeth thereof are inclined.

Referring to the drawings which form part of this specification:—

Figure 1 is a diagrammatic side view showing the invention applied to a stripper harvester, the comb of which is shown in a depressed position. The parts of the invention are shown in full lines and the well known parts of the machine indicated by the heavy dot and dash lines. In light dotted lines the hand lever is shown moved forwardly to raise the crop lifting members.

Figure 1:
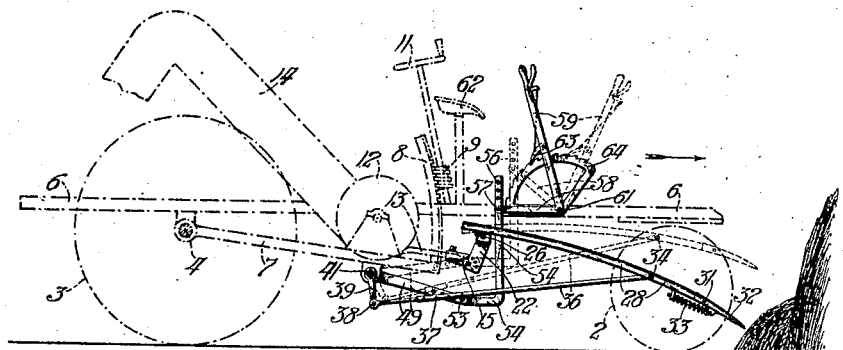

In the drawings, 2 indicates the front supporting wheel of the machine and 3 the rear wheels which are disposed one at each end of the main axle 4. Supported by said axle and the front wheel 2 is a main frame 6. Pivoted at its rear end to the main axle 4 is a subsidiary frame 7 the front end of which carries a toothed sector 8 engaging a worm 9 which is operated by a hand wheel 11 mounted on the main frame of the machine. Mounted on the subsidiary frame 7 is a beater drum 12 in which are situated beaters (not shown) which carry the grain from the comb 13 to the elevator 14.

All the parts so far described are well known and in accordance with common practice.

Attached to selected teeth of the comb 13 are sockets 15. Each socket fits over the point of its respective tooth and is held securely thereon by a screw 16 which passes through a slot 17 in the top of the socket and threads into a removable wedge shaped nut 18, which beds within the hollow in the upper surface of the tooth. The screw 16 is also provided with a washer 19 the lower surface of which is roughened or serrated to engage a similar serrated surface on the top of the socket 15.

Pivoted by a pivot pin 21 to the flattened front end of each socket 14 is the lower end of an upright 22 which may be hinged into different positions about the axis of the pivot 21 and locked in such positions by a bolt 23 passing through adjusting holes 24 in the lower end of the upright 22. Pivoted by a pivot pin 26 to the upper member 22 is a hinging piece 27.

Figure 2:
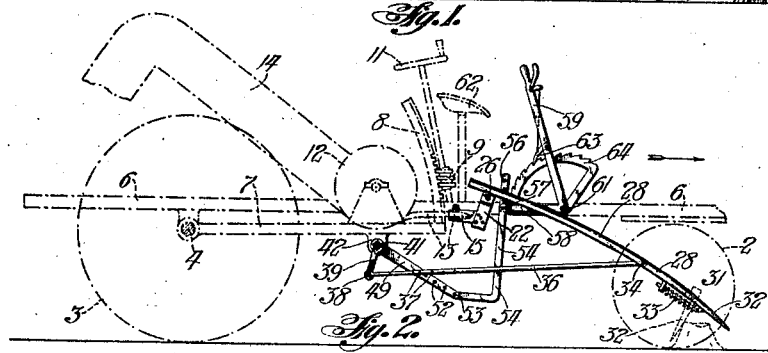
Fig. 2 is a view similar to Fig. 1, but showing the comb in an elevated position and clearly illustrating the manner in which the points of the crop lifting members are maintained near the ground irrespective of the vertical position of the comb. In light dotted lines the point of the crop lifting member is shown hinged backwardly as when an obstruction is encountered.
Figure 3:
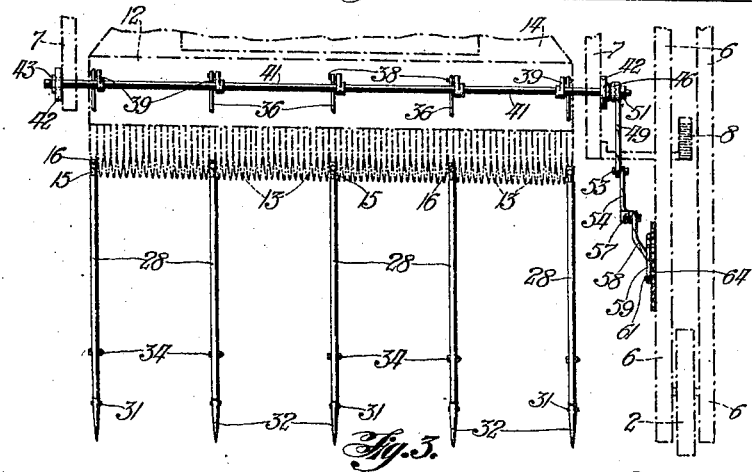
Fig. 3 is a plan of Fig. 2 showing a series of crop lifting members disposed at intervals along the comb. Parts of the machine are broken away for convenience of illustration.

Fixed to the upper end of the hinging piece 27 is the rear end of a forwardly extending crop lifting member 28, these members are preferably curved as shown and are inclined downwardly toward their front ends which project to a suitable distance in front of the comb 13. Pivoted by a pivot pin 31 to the forward end of each lifting member 28 is a hinged point 32 which is disposed at a suitable height above the ground to engage and lift the fallen crop. As shown in Figs. 1 and 2 the hinged point may be provided with a compression spring 33 which is interposed between the point and the member 28 whereby the points are permitted to swing backwardly on striking a stump or other obstruction and to return to normal position after passing the obstruction.

The rear end of the hinged point 32 preferably overlaps the front end of the member 28 thereby forming a limit stop which prevents the points hinging upwardly beyond a certain degree but permits them to be hinged backwardly against the action of the spring as above stated.

Pivoted by pivot pins 34 to each of the crop lifting members 28 is the forward end of a connecting rod 36 which is preferably of a telescopic character as shown to allow of adjustment of its length by inserting a locking pin in any of the adjusting holes 37 as desired. Each of the connecting rods 36 extends rearwardly beneath the comb 13 and its rear end is pivoted at 38 to the outer end of a minor arm or lever 39. The inner ends of these minor levers are fixed to a square cross bar 41 which extends from side to side of the machine and is supported at each end in bearings 42 attached to the subsidiary frame 7. The square cross bar is thus adapted to move up and down with the comb when the subsidiary frame 7 is raised and lowered through the medium of the hand wheel 11 and rack 8.

Figure 8:
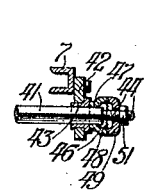
Fig. 8 is an enlarged sectional view showing the method of supporting the ends of a square cross bar and the manner in which a major arm or lever is rigidly secured to one end of said cross bar.

The two ends of the cross bar 41 pass through square holes formed in cylindrical bushes 43 accommodated by the bearings 42. One end of the cross bar is also provided with a reduced threaded end 44. Passing over this reduced portion is a washer 46 which has a square hole 47 accommodating the squared end of the cross bar as clearly shown in Fig. 8. On the outer face of the washer 46 are a series of radial teeth or serrations 48 which engage similar serrations on the rear end of a major arm or lever 49 which is held tightly against the washer 46 by a nut 51 engaging the threaded end of the cross bar.

The major arm or lever 49 is thus securely fixed to the end of the cross bar 41 but may be angularly adjusted thereon, by slackening the nut 51. The forward end of the major lever 49 is provided with a series of adjusting holes 52 accommodating a pivot pin 53 by which it is pivoted to the lower end of an upright link 54.

The upper end of the link 54 is also provided with a series of adjusting holes 56 to accommodate a pivot pin 57 by which said link is connected to the arm 58 of a bell crank hand lever 59 which is pivoted by a pin 61 to the main frame 6 in a position conveniently accessible from the driver's seat 62.

The hand lever 59 is provided with a pawl 63 engaging a quadrant 64 which is provided with ratchet teeth inclined in one direction as shown so that should for instance an obstruction be encountered which forces the point of the respective crop lifting member backwardly as seen in dotted lines in Fig. 2 it will also cause the forward end of the member 28 to lift upon its rear pivot 26. This will cause the connecting rods 36 to be drawn forwardly thereby oscillating the cross bar 41 and through the lever 49 and the link 54 causing the hand lever to swing forwardly around the quadrant the inclination of the teeth of which allows the pawl 63 to pass in that particular direction. By the operator drawing the hand lever back the crop lifting members will be returned to normal position.

It will thus be seen that by operation of the hand lever the crop lifting members 28 may also be raised or lowered at the will of the operator. Should, however the comb be raised or lowered through the medium of the hand wheel 11, to suit varying heights of crop, the hand lever will remain stationary and the major lever 49 will cause the cross bar 41 to be partially rotated thus causing the minor levers to move the connecting rods 36 backwardly or forwardly as the case may be, thereby maintaining the points of the crop lifting members at a height sufficiently near the ground to engage and lift the fallen crop, whatever the position of the comb may be. This action is clearly indicated by a comparison of Figs. 1 and 2.

Figure 4:
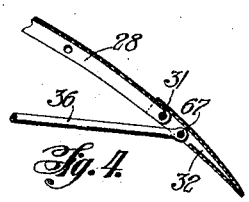
Fig. 4 is an enlarged view of a modification in which the spring means at the points of the crop lifting members are dispensed with and a connecting rod (hereinafter described) is attached directly to said point.

As shown in Fig. 4 the springs 33 at the points of the crop lifting members may in some cases be dispensed with and the connecting rods 36 attached directly to the points 32 by means of pivot pins 67 as illustrated.

Figures 5, 6, 7:
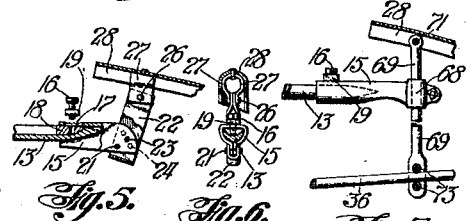
Fig. 5 is an enlarged detail view showing a method of attaching the rear ends of the crop lifting members to the teeth of the comb.
Fig. 6 is a part sectional end view of Fig. 5.
Fig. 7 is a detail view of a modification in which the rear ends of the crop lifting members are supported by vertically sliding rods.

The means of supporting the rear ends of the crop lifting members to the comb may also be modified in various different ways. In Fig. 7 the socket 14 is rigidly attached to the selected teeth of the comb as before described, but in lieu of the member 22 the socket is provided at its front end with a vertical guideway 68 through which freely passes a vertical sliding rod 69. The upper end of this rod is pivoted by a pivot pin 71 to the rear end of the respective crop lifting member 28. Carried by the lower end of the rods 69 are rollers 73 between which the connecting rods 36 freely pass and are thus capable of assuming the various different attitudes brought about by the different positions of the levers 39.

As the machine moves forwardly the members 28 thread their way through the crop and on coming into contact with any stalks which may have fallen or been broken down, will pass beneath and raise them to an upright position to be engaged by the teeth of the comb which removes the ears of corn as the machine progresses. By this means the likelihood of fallen portions of the crop being passed over without treatment, as is at present frequently the case, is obviated. It will furthermore be seen that even though the comb may be raised or lowered according to variations in the heights of the crop the distance between the points of the crop lifting members and the ground is not materially altered so that the fallen stalks will always be engaged and lifted unless the crop lifting members are raised out of action by the hand lever 59. By this hand lever, the crop lifting members may also be vertically adjusted as desired, or lifted over an obstruction, quite independently of any movement of the comb.

As the features of this invention might be otherwise applied and carried out by various modifications of construction and arrangements without departing from its nature, spirit and scope, it is intended and desired that the matter contained in the foregoing description shall be interpreted as illustrative of a suitable embodiment and not in a limiting sense.

Having now described my invention what I claim as new and desire to secure by Letters Patent is:—

1. In a machine of the kind indicated, having a comb, a series of crop lifting members which project in front of the comb of the machine to raise fallen portions of the crop into position to be seized by the teeth of said comb as the machine progresses, said members being mounted upon substantially horizontal pivots near the comb to swing substantially vertically about said pivots, and means to permit of the free upward movement of the members and to automatically lock the same against downward movement.

2. In a machine of the kind indicated, the combination with a subsidiary frame capable of being raised and lowered and a comb supported by said subsidiary frame, of crop lifting members pivotally supported at their rear ends adjacent said comb, a cross bar carried by said subsidiary frame, minor levers fixed to said cross bar, connecting rods pivoted at their forward ends to the crop lifting members and at their rear ends to said minor levers, a major lever fixed at one end to said cross bar and means connected with the other end of said major lever to cause the cross bar to be rotated as the subsidiary frame is raised or lowered.

3. In a machine of the kind indicated, the combination with a subsidiary frame pivoted at its rear end and supporting a comb at its forward end, of crop lifting members pivotally mounted at their rear ends, a cross bar carried by said subsidiary frame, minor levers fixed to said cross bar, connecting rods pivoted at their forward ends to the crop lifting members, and at their rear ends to said minor levers, a major lever fixed at one end to said cross bar, a link connected to the other end of said major lever, a hand lever connected to said link and means for locking said hand lever in stationary position.

4. In a machine of the kind indicated, having a comb, a series of crop lifting members which project in front of the comb of the machine to raise fallen portions of the crop into position to be seized by the teeth of said comb as the machine progresses, a hinged point to each of said crop lifting members and springs permitting said points to yield when meeting an obstruction.

5. In a machine of the kind indicated, the combination with a main frame, a subsidiary frame pivoted at its rear end to said main frame, a comb on the forward end of the subsidiary frame, and means for raising and lowering said subsidiary frame about its rear pivot, of a series of crop lifting members pivotally mounted at their rear ends above said comb, a square cross bar rotatably supported by the subsidiary frame, minor levers fixed to said cross bar, adjustable connecting rods extending between said minor levers and the crop lifting members, hinged points to said crop lifting members, a major lever fixed to one end of said cross bar, a link pivoted at its lower end to said major lever, a bell crank hand lever fulcrumed on the main frame and pivoted to said link and a pawl and quadrant associated with said hand lever, said quadrant having inclined ratchet teeth for the purpose set forth.

6. In a machine of the character described, a comb, a plurality of crop lifting members having pivotal connection with the teeth of the comb to swing substantially vertically with relation thereto, extensions pivotally connected with the forward ends of the members and adapted to be swung downwardly when engaging with an obstruction, said extensions when being swung downwardly serving to elevate said members, and means to permit of the free upward movement of the members and serving to automatically lock the same against downward movement.

7. In a machine of the character described, a comb, a plurality of crop lifting members having pivotal connection with the teeth of the comb to swing substantially vertically with relation thereto, extensions pivotally connected with the forward ends of the members and normally projecting forwardly beyond the same to form continuations thereof, said extensions being adapted to be swung downwardly upon engagement with an obstruction and serving to elevate said members upon being swung downwardly upon their pivots, yielding means to oppose the swinging movement of the extensions upon their pivots, and means to permit of the free upward movement of the members and serving to automatically lock them against downward movement.

8. In a machine of the kind indicated, the combination with a subsidiary frame, of means to raise and lower the subsidiary frame, a comb supported by said subsidiary frame, of crop lifting members pivotally supported at their rear ends adjacent said comb, a cross bar carried by said subsidiary frame, minor levers fixed to said cross bar, connecting rods pivoted at their forward ends to the crop lifting members and at their rear ends to said minor levers, a major lever fixed at one end to said cross bar and means connected with the other end of said major lever to cause the cross bar to be rotated as the subsidiary frame is raised or lowered.

9. In a machine of the kind indicated, the combination with a subsidiary frame pivoted at its rear end and supporting a comb at its forward end, of crop lifting members pivotally mounted at their rear ends, a cross bar carried by said subsidiary frame, minor levers fixed to said cross bar, connecting rods pivoted at their forward ends to the crop lifting members, and at their rear ends to said minor levers, a major lever fixed at one end to said cross bar, a link connected to the other end of said major lever, a hand lever connected to said link and means for locking said hand lever in stationary position.

10. In a machine of the kind indicated, the combination with a main frame, a subsidiary frame pivoted at its rear end to said main frame, a comb on the forward end of the subsidiary frame, and means for raising and lowering said subsidiary frame about its rear pivot, of a series of crop lifting members pivotally mounted at their rear ends above said comb, a square cross bar rotatably supported by the subsidiary frame, minor levers fixed to said cross bar, adjustable connecting rods extending between said minor levers and the crop lifting members, hinged points to said crop lifting members a major lever fixed to one end of said cross bar, a link pivoted at its lower end to said major lever, a bell crank hand lever fulcrumed on the main frame and pivoted to said link and a pawl and quadrant associated with said hand lever, said quadrant having inclined ratchet teeth for the purpose set forth.

In testimony whereof I affix my signature.

F. C. LIESCHKE.

Witness:
CECIL W. LE CLASTNER.

Copies of this patent may be obtained for five cents each, by addressing the "Commissioner of Patents, Washington, D. C."